United States Patent
Yue et al.

(10) Patent No.: US 8,446,811 B2
(45) Date of Patent: May 21, 2013

(54) CONSTELLATION RE-ARRANGEMENT AND BIT GROUPING

(75) Inventors: Guosen Yue, Plainsboro, NJ (US); Xiaodong Wang, New York, NY (US)

(73) Assignee: NEC Laboratories America, Inc., Princeton, NJ (US)

( * ) Notice: Subject to any disclaimer, the term of this patent is extended or adjusted under 35 U.S.C. 154(b) by 463 days.

(21) Appl. No.: 12/762,065

(22) Filed: Apr. 16, 2010

(65) Prior Publication Data

US 2010/0271929 A1    Oct. 28, 2010

Related U.S. Application Data

(60) Provisional application No. 61/172,407, filed on Apr. 24, 2009.

(51) Int. Cl.
*H04J 13/00*    (2006.01)
*H04J 99/00*    (2009.01)

(52) U.S. Cl.
USPC .......................................... 370/203; 370/476

(58) Field of Classification Search ................ None
See application file for complete search history.

(56) References Cited

U.S. PATENT DOCUMENTS

| | | | |
|---|---|---|---|
| 8,214,696 B2 * | 7/2012 | Kang et al. ................ | 714/701 |
| 8,225,165 B2 * | 7/2012 | Zheng ........................ | 714/752 |
| 2003/0081576 A1 * | 5/2003 | Kim et al. .................. | 370/335 |

OTHER PUBLICATIONS

Huang et al., "Proposed Text on Constellation Re-arrangement for IEEE 802.16m Amendment", Mar. 9, 2009, IEEE 802.16 Broadband Wireless Access Working Group, pp. 1-4.*
Lee et al., "Proposed Text of CTC Bit grouping for IEEE 802.16m Amendment", Mar. 10, 2009, IEEE 802.16 Broadband Wireless Access Working Group, pp. 1-12.*
Fang, Y. et al., "Performance Comparison for Bit Priority Mapping and 16e Mapping in the 1st Transmission", IEEE 802.16m-09/0573r1, Mar. 29, 2009, pp. 1-11.
Gong, X. et al., "Constellation Re-Arrangement Schemes and Simulation Result", IEEE C802.16m-09/0493r2, Mar. 10, 2009, 17 pages.
Hamiti, S., "IEEE 802.16m System Description Document [Draft]", IEEE 802.16m-08/003r8, Apr. 10, 2009, pp. 1-180.
Hamiti, S., "The Draft IEEE 802.16m System Description Document", IEEE 802.16m-08/003, Jan. 23, 2008, 19 pages.
Huang L. et al., "Proposed Text Constellation Re-Arrangement for IEEE 802.16m Amendment", IEEE C802.16m-09/0728, Mar. 9, 2009, pp. 1-4.

(Continued)

*Primary Examiner* — Gregory Sefcheck
*Assistant Examiner* — Steve Young
(74) *Attorney, Agent, or Firm* — Joseph Kolodka; James Bitetto

(57) ABSTRACT

Methods and systems for subpacket generation using a convolutional turbo code in hybrid automatic repeat request re-transmissions that includes separating a codeword into sub-blocks of bits, interleaving the subblocks, and performing a permutation to group the bit streams and rearrange a symbol constellation such that bits are assigned to bit positions based on a number of re-transmissions.

7 Claims, 5 Drawing Sheets

OTHER PUBLICATIONS

IEEE 802.16m, "Part 16: Air Interface for Fixed and Mobile Broadband Wireless Access Systems: Advance Air Interface (Working Document)", IEEE 802.16m-09/0010r1a (working document), Mar. 2008, pp. 1-148.

IEEE Computer Society, "Draft Standard for Local and Metropolitan Area Networks, Part 16: Air Interface for Broadband Wireless Access Systems", IEEE P802.16Rev2/D3, Feb. 2008, pp. xvii-xlv, 1, 605-609, 1010-1012 of 1880 pages.

Lee, J.W. et al., "Proposed Text of CTC Bit Grouping for IEEE 802.16m Amendment", IEEE C802.16m-09/0665r1, Mar. 10, 2009, pp. 1-12.

Park, H. et al., "Mapping Rule for Constellation Rearrangement", IEEE C802.16m-09/0676r4, Mar. 10, 2009, 16 pages.

Pi, J., "Proposed Text of Channel Coding and Harq for the IEEE 802.16m Amendment", IEEE C802.16m-09/0510r2, Mar. 11, 2009, pp. 1-11.

\* cited by examiner

CONSTELLATION RE-ARRANGEMENT AND BIT GROUPING

RELATED APPLICATION INFORMATION

This application claims priority to provisional application Ser. No. 61/172,407 filed on Apr. 24, 2009, incorporated herein by reference.

BACKGROUND

1. Technical Field

The present invention relates to constellation re-arrangement and bit grouping in modulation schemes and, in particular, to methods and systems for performing such grouping and re-arrangement in a modulation scheme that has variable bit reliability and hybrid automatic repeat request error control.

2. Description of the Related Art

A convolutional turbo code (CTC) with code rate ⅓ has been adopted by the IEEE 802.16m System Description Document (SDD) and included in the IEEE 802.16m Amendment Working Document (AWD), defining a new ARP interleaver table. The IEEE 802.16e standard defines procedures for CTC subpacket generation to generate the subpackets for rate matching in the case of packet transmission with Hybrid Automatic Repeat reQuest (HARQ). For the high order modulations that will be supported in IEEE 802.16m, e.g. 16 QAM or 64 QAM, the bit grouping method that is described in IEEE 802.16e is not optimal.

When using HARQ, there are sometimes overlapped bits between two (re)transmission blocks. When the same modulation form is applied for both transmissions, the decoding performance after bit-level Chase combining (wherein every re-transmission comprises the same information as the original transmission) will be degraded significantly if the same bits from two transmission blocks mapped to the bits with the same reliabilities in a high order quadrature amplitude modulation (QAM). This happens because, if a given bit is placed in a low-reliability position in the QAM symbol, retransmitting the exact same symbol will continue to expose that bit to a higher likelihood of failure. To overcome the performance degradation caused by same-constellation mapping in re-transmission, constellation rearrangement (CoRe) was proposed as a mechanism and included in the IEEE 802.16m SDD.

However, the previously published CoRe schemes suffer either from sub-optimal reliability or from a lack of a simple implementation. This produces an unfortunate tradeoff between using a better-performing code and a cheaper to implement code.

SUMMARY

The present principles are directed to a simple, two-version constellation rearrangement for high order modulations including 16 quadrature amplitude modulation (QAM) and 64 QAM constellations. The present constellation rearrangement is 1-bit right circular shift for the in-phase (I) and quadrature (Q) components individually in a given QAM scheme. Such a permutation can be cheaply and quickly implemented, while still maintaining superior reliability. With the present principles, bit grouping and constellation re-arrangement may be implemented in a single permutation, thereby providing further efficiency benefits.

A method for subpacket generation is shown that includes the steps of separating a codeword into subblocks of bits, producing at least one data subblock and at least one parity subblock; interleaving the subblocks into bit streams; grouping the bit streams by multiplexing sequences of similar type; and performing a permutation to group the bit streams and rearrange a symbol constellation such that bits are assigned to bit positions based on a number of re-transmissions using a processor.

A method for subpacket generation using a convolutional turbo code in hybrid automatic repeat request re-transmissions is shown that includes the steps of separating a codeword into subblocks of bits, producing at least one data subblock and at least one parity subblock; interleaving the subblocks into bit streams; and permuting the bit streams by cyclically bit-shifting each component of a symbol to the right by one bit using a processor, such that the bit streams form multiplexed sequences of similar bit type.

A system for subpacket generation is shown that includes a bit separation module configured to separate a codeword into subblocks of bits, producing at least one data subblock and at least one parity subblock; a plurality of interleavers configured to interleave the subblocks into bit streams; and a constellation symbol permutation module including a processor configured to group the bit streams and to permute the groups such that bits are assigned to bit positions based on a number of re-transmissions.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The 802.16m standard is part of the WiMAX effort to produce a standard for wireless metropolitan area networks. The standard defines procedures for subpacket generation for convolutional turbo codes in the case of packet transmission with hybrid automatic repeat request (ARQ). In practical wireless systems, not simply those described by the 802.16 standards, after the channel encoding there are several procedures for subpacket generation to generate the subpackets for rate matching in the case of packet transmission with hybrid ARQ. Subpacket generation after channel encoding includes the following four steps: (1) bit separation; (2) sub-block interleaving; (3) bit grouping; and (4) bit selection. The present principles advantageously allow for a combining of steps 3 and 4, with the additional benefit of providing a simple and efficient way to re-arrange symbol constellations such that re-transmitted bits are not sent with the same reliabilities as when they were previously transmitted.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Figure 1:
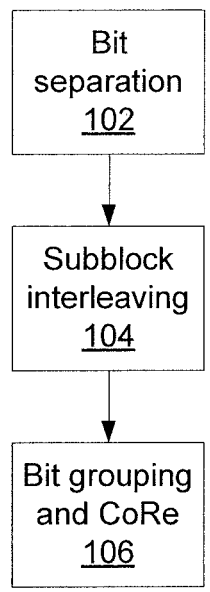
FIG. 1 is a block/flow diagram showing an illustrative method for convolutional turbo code subpacket generation according to the present principles.

Referring now to FIG. 1, the present principles provide for simple constellation re-arrangement for hybrid ARQ, such that a unified method is possible that implements bit grouping and constellation re-arrangement in one unit. Block 102 performs the step of bit separation, dividing bits into subblocks which represent data streams and their corresponding parity bits. Block 104 interleaves the subblocks. Block 106 then groups the bits (for example by combining the parity bits of the respective data streams) and performs a constellation re-arrangement, thereby selecting bits for modulation which make best use of the variations in bit reliability.

Figure 2A:
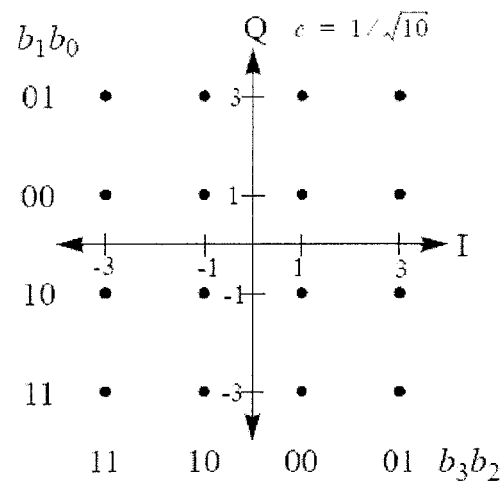
FIG. 2a is a graph showing an exemplary quadrature amplitude modulation (QAM) constellation for 16-QAM.
Figure 2B:
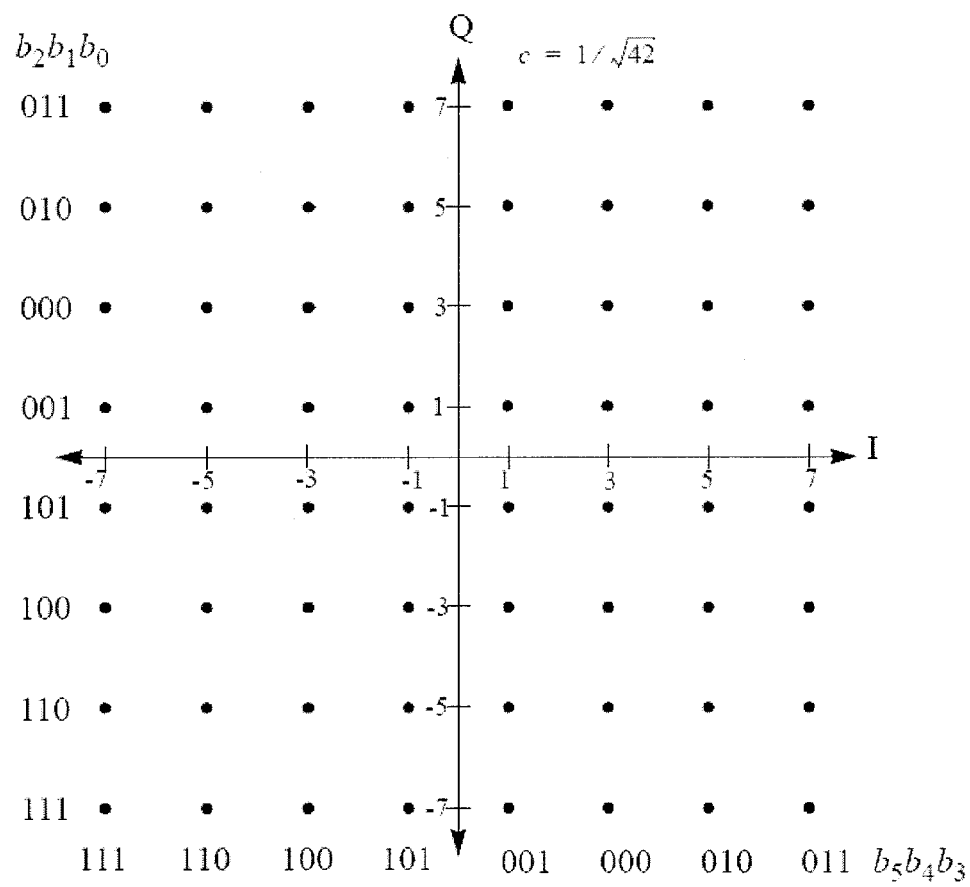
FIG. 2b is a graph showing an exemplary constellation for 64-QAM.

Referring now to the drawings in which like numerals represent the same or similar elements and initially to FIGS. 2a and 2b, constellations are shown which depict bit orders for 16 quadrature amplitude modulation (QAM) and 64-QAM respectively. The vertical axis in each reflects the quadrature (Q) component of the signal, while the horizontal axis represents the in-phase (I) component. Each component is comprised of multiple bits, and each point on the constellation represents a complete symbol comprising four or six bits, in the case of 16-QAM and 64-QAM respectively. These two modulation schemes are used in this document for the purpose of illustration only and are not intended to be limiting. Other modulation schemes can also be employed.

According to the present principles, for a given modulation scheme, two versions of constellation re-arrangement (CoRe) are shown. The bit sequences for two illustrative CoRe versions are presented in Table 1. For the first version, version 0, the order of the bit sequence in a QAM symbol is in the natural order, i.e., $b_3b_2b_1b_0$ for 16 QAM and $b_5b_4b_3b_2b_1b_0$ for 64 QAM. Based on the bit-symbol mapping for 16 QAM and 64 QAM modulations defined in IEEE 802.16e, $b_0, b_2$ in a 16 QAM symbol and $b_0, b_3$ in a 64 QAM symbol are the least reliable bits among the bits mapped to a QAM symbol, while $b_1, b_3$ in a 16 QAM symbol and $b_2, b_5$ in a 64 QAM symbol are the most reliable bits. As shown in Table 1, in the second CoRe version, version 1, one can move the least reliable bits to the positions of the most reliable bits in a QAM symbol, e.g., $b_0 \rightarrow b_1$, $b_2 \rightarrow b_3$ for 16 QAM and $b_0 \rightarrow b_2$, $b_3 \rightarrow b_5$ for 64 QAM. The rest of the bits are 1-bit shifted to the right. In the case of 16-QAM and 64-QAM, the result is that all of the bits for each half of the symbol are 1-bit shifted to the right. The final order of the bit sequence of CoRe version 1 is one-bit circularly shifted to the right for I and Q components individually.

TABLE 1

| Constellation re-arrangement for 16 QAM and 64 QAM | | |
|---|---|---|
| CoRe Version $z = \{0, 1\}$ | 16-QAM | 64-QAM |
| z = 0 | $b_3b_2b_1b_0$ | $b_5b_4b_3b_2b_1b_0$ |
| z = 1 | $b_2b_3b_0b_1$ | $b_3b_5b_4b_0b_2b_1$ |

This technique can be used for other modulation formats as well. For example, the technique can be readily extended to a 256-QAM scheme which uses eight bits per symbol. With additional bits per symbol, it is possible to implement additional re-arrangements.

It should be noted that version 0 is in fact the unmodified bit order. For hybrid ARQ, the number of retransmissions may exceed two, in which case version zero may be used in subsequent retransmissions as a re-arrangement of version 1. It is also possible to use additional versions with higher degree modulation schemes, in which case the version number may be greater than one.

Figure 3:
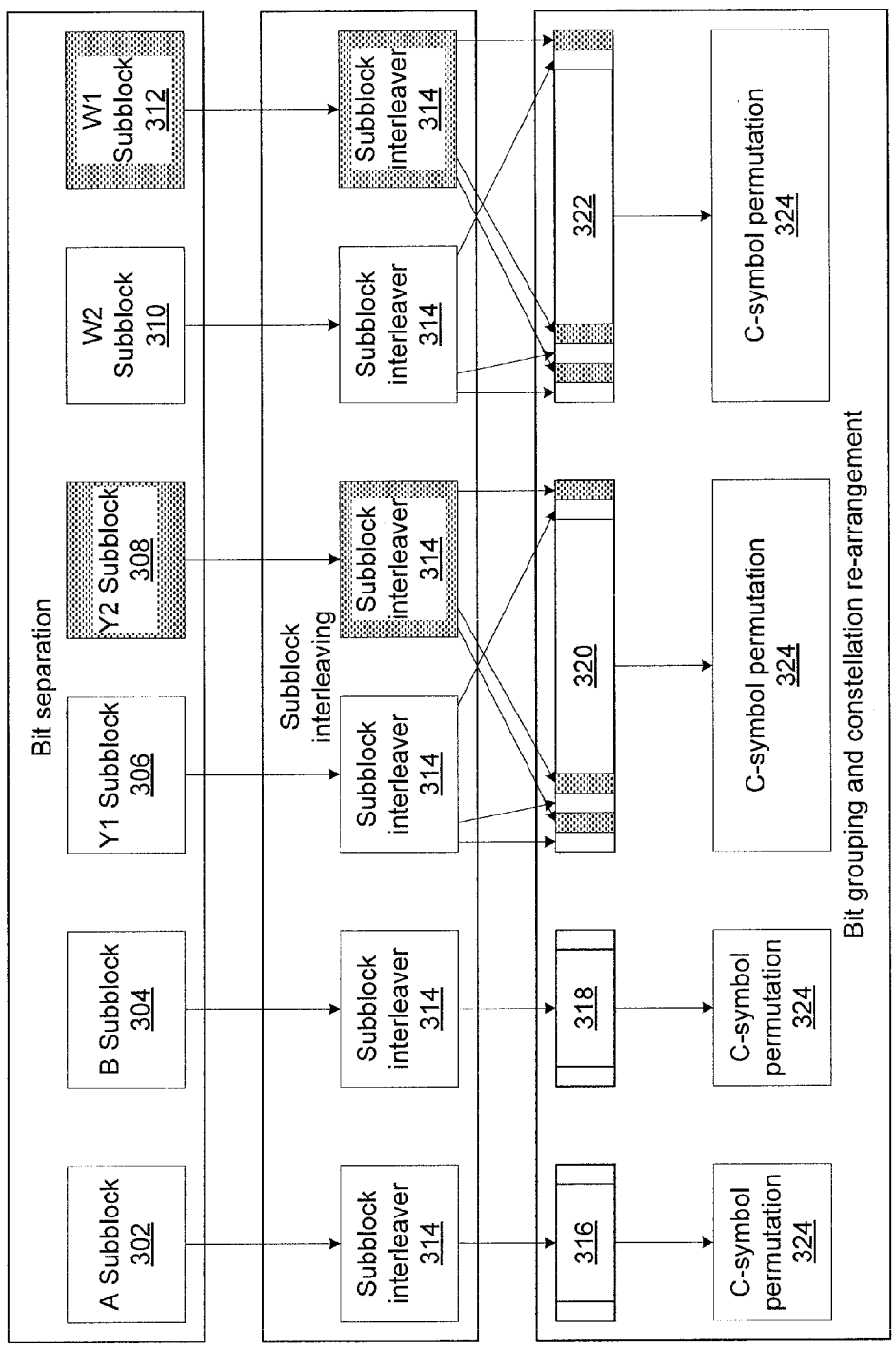
FIG. 3 is a block/flow diagram showing an illustrative system/method for bit grouping and constellation re-arrangement according to the present principles.

Referring now to FIG. 3, a block diagram is shown depicting a technique for implementing the present principles. An incoming bitstream is interleaved into A 302, B 304, $Y_1$ 306, $Y_2$ 308, $W_2$ 310, and $W_1$ 312 as part of a bit separation step. The subblocks are then interleaved in interleavers 314. Subblocks A and B are interleaved separately, producing an A bitstream 316 and a B bitstream 318 respectively. The $Y_1$ and $Y_2$ subblocks are interleaved together to produce bitstream 320, and the $W_2$ and $W_1$ subblocks are interleaved together to produce bitstream 322. Each bitstream is then re-arranged in constellation-symbol petinutation modules 324.

The subblock interleaving shown as blocks 314 in FIG. 3 is used to combat burst noise (also known as burst error). Burst noise causes low reliabilities on small blocks of consecutive bits in a codeword if they have not been interleaved, thereby degrading the decoding performance. The interleaving at blocks 314 randomizes the burst noise in the time domain and, consequently, improves the decoding performance.

The Y and W blocks represent parity bits. For example, in the convolutional turbo code (CTC) defined in the IEEE 802.16m standard, information bits are divided into an A part and a B part. Each bit of information has a corresponding Y and W parity bit. Hence, a $Y_1$ and $Y_2$ stream is generated for the A and B streams respectively, and similarly respective W streams are generated.

In this example, the W parity streams are shown as being used in the reverse order as compared to the Y parity streams. That is, the Y streams are interleaved in the order $Y_1$ then $Y_2$, whereas the W streams are interleaved in the order $W_2$ then $W_1$. Usually the length of information block A+B, as well as the parity parts, Y1+W1, and Y2+W2, are the integer multiples of the number of bits per symbol. With the normal order (e.g., $Y_1Y_2$ and $W_1W_2$), the first bit of $Y_1$ and the first bit of $W_1$ would be in the same bit position of the QAM symbol and have, consequently, the same reliability. The same would result for $Y_2$ and $W_2$.

With the reverse order, $Y_1$ and $W_2$ are mapped to the same bit position of the QAM symbol, consequently, the same reliability. Similarly for $Y_2$ and $W_1$. Then for each encoder (and, consequently, for each decoding process) different reliabilities are obtained for the bit sequence. Such diversity can improve the overall performance of the CTC code.

After being multiplexed into respective bitstreams, every C bits of the bitstreams are permuted in modules 322 to prevent contiguous bits from being allocated into levels of the same reliability when modulation. Each sub-block is formed into R, which is set to $\lfloor N/C \rfloor$ for subblocks A and B and to $\lfloor 2N/C \rfloor$ for subblocks $Y_1/Y_2$ and $W_2/W_1$, where C is the number of bits per modulated symbol, N is the length of the input sequence for A or B, and $\lfloor N/C \rfloor$ denoted the floor value of N/C. Bits in each group of four interleaved subblocks are further permuted as follows:

$$A_i(j)=(j+(i \bmod C)) \bmod C, j=0,\ldots,C-1,\\ i=0,\ldots,\lfloor N/C \rfloor-1,$$

$$B_i(j)=(j+((i+1+\delta) \bmod C)) \bmod C, j=0,\ldots,\\ C-1, i=0,\ldots,\lfloor N/C \rfloor-1,$$

$$Y1/Y2_i(j)=(j+((i+1) \bmod C)) \bmod C, j=0,\ldots,\\ C-1, i=0,\ldots,\lfloor N/C \rfloor-1, \text{ and}$$

$$W2/W1_i(j)=(j+((i+1) \bmod C)) \bmod C, j=0,\ldots,\\ C-1, i=0,\ldots,\lfloor N/C \rfloor-1.$$

In these permutations, C represents the modulation order (e.g., for 16-QAM, C=4 and for 64-QAM, C=6). $\delta$ is set to 1 for 64-QAM and to 0 for other modulation schemes. In the above equations, $A_i(j)$, $B_i(j)$, $Y1/Y2_i(j)$ and $W2/W1_i(j)$ indicate the permutation formula for the $j^{th}$ element of the $i^{th}$ group of sub-block A, B, Y1/Y2 and W1/W2 respectively. The quantity $\delta$ is an offset in the bit grouping introduced to adjust the permutation order for different modulations. For example, for 64-QAM, there are 3 bits per I/Q component. By setting $\delta$ to 1, one can not only differentiate the permutation pattern with the parity bits but also obtain the correct order of the reliabilities for the bits in the consecutive symbols.

Bit grouping and CoRe can be unified by one set of permutation functions for symbol I, constellation bit j in a QAM symbol, a feature which is an advantageous result of performing CoRe through a simple permutation. This feature allows for a substantial reduction in the complexity of transmission, as it combines two separate functions into one simple, mathematical operation. One exemplary set of such permutation functions is given below:

$$A_i^z(j)=((j+z) \bmod c/2+\lfloor 2j/C \rfloor *c/2+(i \bmod C)) \bmod\\ C, j=0,\ldots,C-1, i=0,\ldots,\lfloor N/C \rfloor-1, z=0,1 \quad (1)$$

$$B_i^z(j)=((j+z) \bmod c/2+\lfloor 2j/C \rfloor *c/2+((i+1+\delta) \bmod\\ C)) \bmod C, j=0,\ldots,C-1, i=0,\ldots,\lfloor N/C \rfloor-1, z=0,1 \quad (2)$$

$$Y1/Y2_i^z(j)=((j+z) \bmod c/2+\lfloor 2j/C \rfloor *c/2+((i+1) \bmod\\ C)) \bmod C, j=0,\ldots,C-1, i=0,\ldots,\\ \lfloor 2N/C \rfloor-1, z=0,1 \quad (3)$$

$$W2/W1_i^z(j)=((j+z) \bmod c/2+\lfloor 2j/C \rfloor *c/2+((i+1) \bmod\\ C)) \bmod C, j=0,\ldots,C-1, i=0,\ldots,\\ \lfloor 2N/C \rfloor-1, z=0,1 \quad (4)$$

As above, z represents the version number, zero or one, being employed. In applying these permutations, the steps of bit grouping and of CoRe may be advantageously combined. Combining these steps results in substantial savings in the implementation cost. First, bit shifting by permutation is easier to implement in the hardware than is the case for dedicated bit rearrangement. Second, bit shifting is already employed in the bit grouping. With a slightly change on the bit shifting used by the bit grouping, both functions of bit grouping and constellation rearrangement can be achieved in a single unit.

Figure 4:
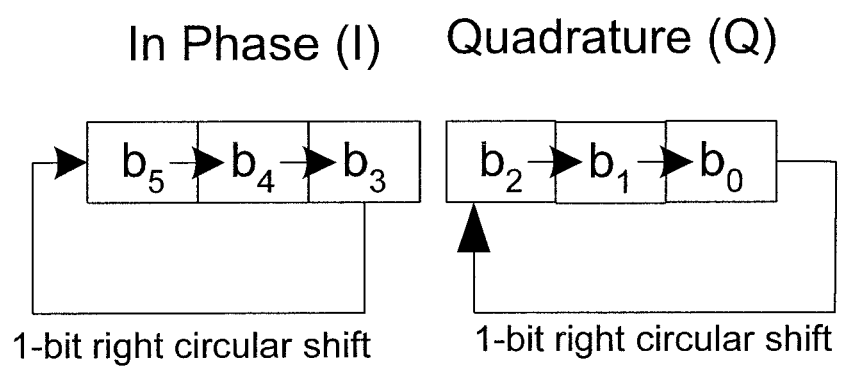
FIG. 4 is a diagram showing an exemplary 64-QAM symbol with its in-phase and quadrature components being bit-shifted to the right by one bit according to the present principles.

Referring now to FIG. 4, a simple graphical representation of the present CoRe scheme is shown in the case of 64-QAM. The first three bits, $b_5 b_4 b_3$, representing the I component of the symbol, are each shifted one bit to the right, producing a new bit order of $b_3 b_5 b_4$. Similarly, the three bits representing the Q component are shifted one bit to the right. By performing this permutation, the least reliable bits in the codeword are placed in the most reliable positions in the symbol, leading to substantially increased performance. In addition, as can be seen from the equations above, a simple one-bit shift is computationally very easy to implement, resulting in high-speed and low-cost embodiments. Additionally, as will be discussed below, there are multiple versions of the permutation which allow for varying sequences across multiple re-transmissions. Combining this CoRe functionality with bit grouping in a single permutation function allows for highly advantageous improvements over previously used techniques.

After the permutation, the bit groups are multiplexed to produce QAM symbols. In one example, a CTC codeword may have over a hundred bits. If the codeword length is not integer multiples of the number of bits per symbol for the modulation scheme, zero padding may be applied to adjust it. For example, if bit-to-symbol mapping starts from the beginning of group A, the system will select the first C bits of group A (C=6 bits for 64-QAM, or 4 bits for 16-QAM) to Rhin the first QAM symbol, then the subsequent C bits of group A form the next QAM symbol. After finishing group A, it will go to group B, followed by Y1/Y2 and W2/W1. For a total length 6L codeword bits, it will form 6L/C symbols. If a higher code rate than ⅓ is needed, some parity bits or information bits may be omitted, producing a smaller number of symbols.

As noted above, CoRe is used when re-transmitting a symbol under HARQ so the retransmitted symbols do not place bits in similarly vulnerable positions as compared to the original or previous transmission. However, if repeated re-transmissions are necessary, the re-arranged version of the symbol (described as version 1 above) becomes the standard, and repeatedly transmitting the re-arranged symbol will suffer from the same drawbacks as if one were repeatedly transmitting the original (version 0) symbol. It is advantageous to have different bit order for the bit-to-symbol mapping as compared to the previous transmission. If, in the re-transmission sequence, a symbol is transmitted in the original transmission or previous transmission, it is more advantageous to use a different bit order for the bit-to-symbol mapping.

Figure 5:
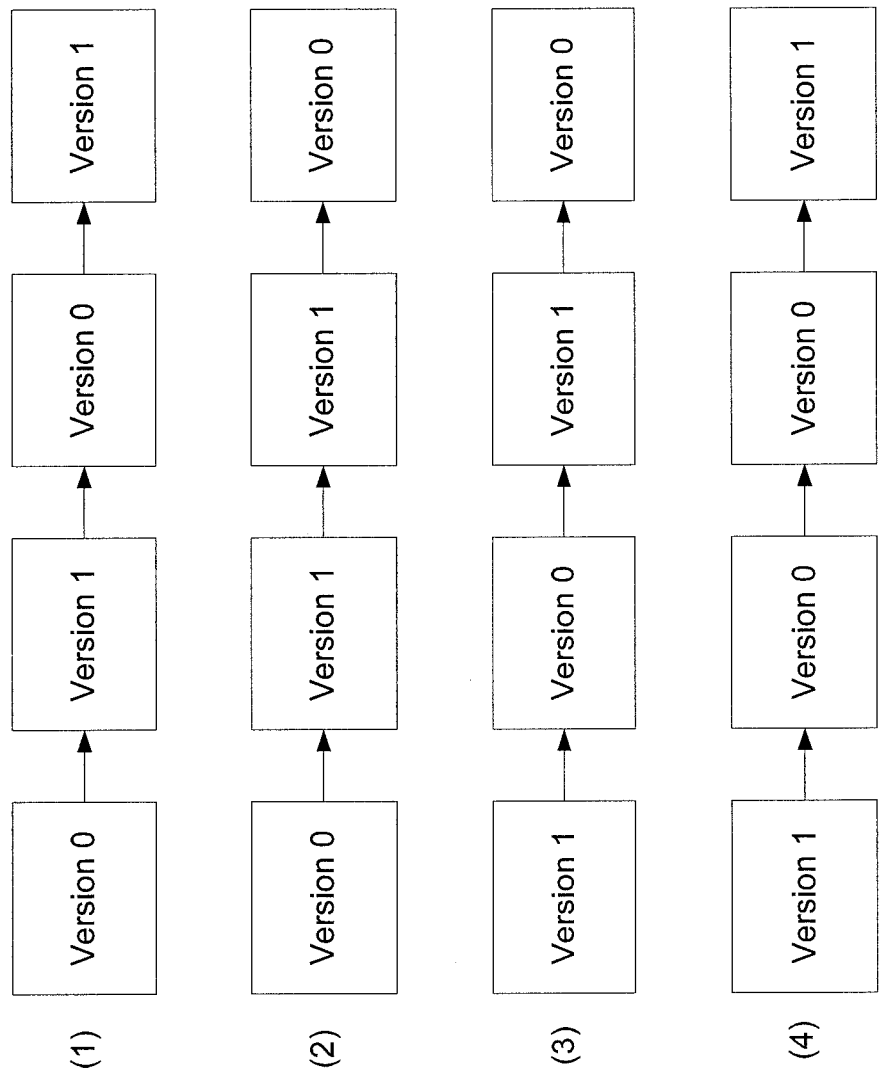
FIG. 5 is a block/flow diagram illustrating constellation re-arrangement across multiple subsequent attempts according to the present principles.

Referring now to FIG. 5, several possible re-transmission orders are illustrated using four transmissions. In addition to a simple alternation of CoRe versions, shown as sequence (1), other sequences are possible. Sequence (2) illustrates a first transmission with version 0, followed by re-transmissions which alternate every other attempt. Sequences (3) and (4) represent the same schemes as shown in sequences (1) and (2), but start with a version 1 transmission. In these examples, every time the version changes, the new transmission represents a re-arrangement of the previous transmission's constellation. Other re-transmission patterns are contemplated. In particular, higher order modulations permit substantial variety in CoRe schemes, allowing for enormous diversity in re-transmission patterns. However, the gain of more-than-two CoRe versions over two CoRe versions is limited and uses more signaling bits in the control channel to indicate the CoRe version to the receiver, resulting in a degradation of the overall throughput. With only two CoRe versions, only one bit for CoRe version is needed to indicate the version to the receiver.

Figure 6:
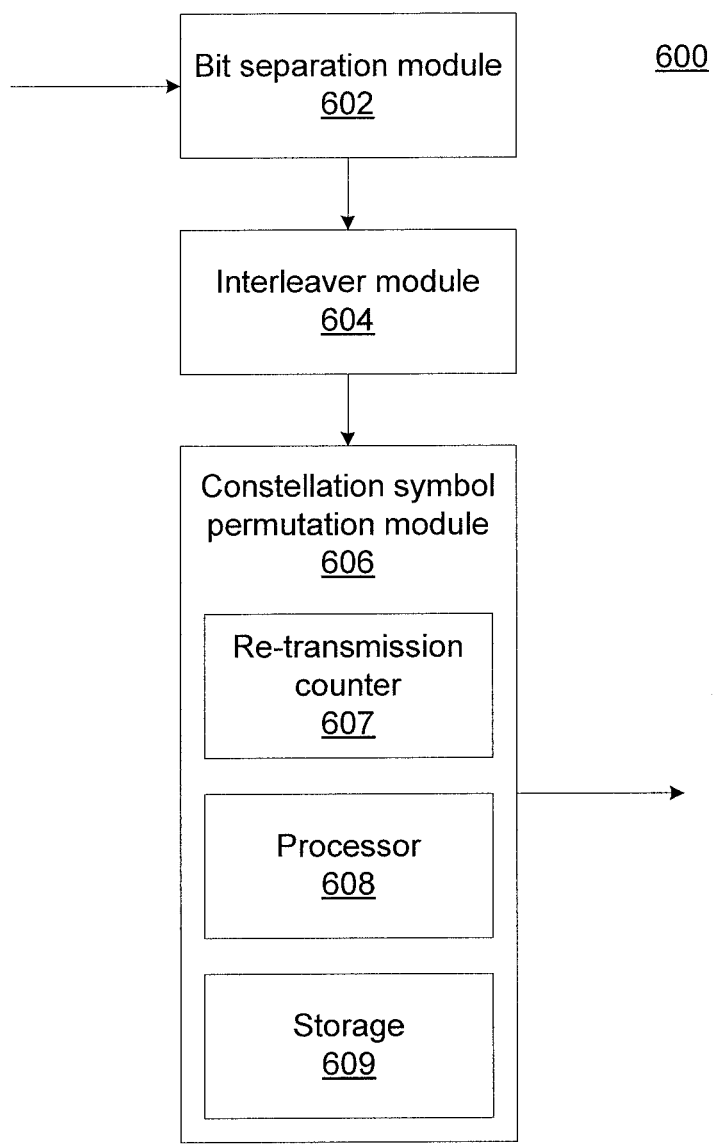
FIG. 6 is a block diagram illustrating an exemplary system for subpacket generation.

Referring now to FIG. 6, an exemplary system for sub-packet generation 600 according to the present principles is shown. Data is received at bit separation module 602, which separates a codeword into subblocks of bits. An interleaver module 604, comprising one or more interleavers, takes the subblocks and interleaves them into respective bit streams. The bit streams pass to a constellation symbol permutation module 606 which groups and permutes the bit streams. Permutation module 606 selects a permutation version as discussed above, and uses a number of previous re-transmissions to inform that decision. To facilitate this, permutation module 606 may include a counter 607 that tracks the number of re-transmissions. Based on the value of counter 607 and a desired re-transmission pattern, as described above with reference to FIG. 5, the permutation module 606 employs a processor 608 to perform the permutation functions shown above as equations 1-4, varying the version number z appropriately. In so doing, the system performs both bit grouping and constellation re-arrangement for each bit stream in a single step. Data is stored in storage 609 between receipt and transmission.

Having described preferred embodiments of a system and method for constellation re-arrangement and bit grouping (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for subpacket generation comprising:
    separating a codeword into subblocks of bits to produce at least one data subblock and at least one parity subblock;
    interleaving the subblocks into bit streams;
    grouping the bit streams by multiplexing sequences of similar type; and
    performing a permutation to group the bit streams and rearrange a symbol constellation such that bits are assigned, using a processor, to bit positions based on a number of re-transmissions;
    wherein the permutation and grouping steps for data bit streams are performed by the following functions:

$$A_i^z(j) = ((j+z) \bmod c/2 + [2j/C]*c/2 + (i \bmod C)) \bmod C, j=0,\ldots,C-1, i=0,\ldots,[N/C]-1$$

$$B_i^z(j) = ((j+z) \bmod c/2 + [2j/C]*c/2 + ((i+1+\delta) \bmod C)) \bmod C, j=0,\ldots,C-1, i=0,\ldots,[N/C]-1$$

where z represents the re-arrangement version number, i represents a bit position within a symbol, C is the modulation order, N is the length of an input sequence for A or B, and $\delta$ is set to 1 for 64-QAM and to 0 for other modulation schemes.

2. The method of claim 1, wherein the step of performing a permutation includes cyclically bit-shifting each group to the right by one bit.

3. The method of claim 1, wherein the permutation and grouping steps for parity bit streams are performed by the following functions:

$$Y1/Y2_i^z(j) = ((j+z) \bmod C/2 + [2j/C]*C/2 + ((i+1) \bmod C)) \bmod C, j=0,\ldots,C-1, i=0,\ldots,[2N/C]-1$$

$$W2/W1_i^z(j) = ((j+z) \bmod C/2 + [2j/C]*C/2 + ((i+1) \bmod C)) \bmod C, j=0,\ldots,C-1, i=0,\ldots,[2N/C]-1$$

where z represents the re-arrangement version number, j represents a bit position within a symbol, C is the modulation order, and N is the length of an input sequence for A or B.

4. The method of claim 1, wherein the symbol constellation is based on 64 quadrature amplitude modulation and individual bit groups are assigned to respective I and Q portions of a resulting symbol.

5. The method of claim 1, wherein the codeword is formed according to a code of rate ⅓ that includes two parity subblocks for each data subblock.

6. The method of claim 5, wherein the step of separating includes separating the codeword into one data subblock and two parity subblocks.

7. The method of claim 1, wherein the permuting step is performed for hybrid automatic repeat request re-transmissions using alternating permutation schemes.

* * * * *